(12) United States Patent
Hayashi et al.

(10) Patent No.: US 9,080,018 B2
(45) Date of Patent: Jul. 14, 2015

(54) METHOD FOR PRODUCING POLYDIALKYLSILANE

(71) Applicant: NIPPON SODA CO., LTD., Tokyo (JP)

(72) Inventors: Kenichi Hayashi, Joetsu (JP); Masamichi Yasuhara, Myouko (JP); Makoto Toyooka, Myouko (JP); Hideki Maekawa, Joetsu (JP)

(73) Assignee: NIPPON SODA CO., LTD., Tokyo (JP)

( * ) Notice: Subject to any disclaimer, the term of this patent is extended or adjusted under 35 U.S.C. 154(b) by 0 days.

(21) Appl. No.: 14/380,109

(22) PCT Filed: Feb. 27, 2013

(86) PCT No.: PCT/JP2013/055120
§ 371 (c)(1),
(2) Date: Aug. 21, 2014

(87) PCT Pub. No.: WO2013/133100
PCT Pub. Date: Sep. 12, 2013

(65) Prior Publication Data
US 2015/0018506 A1 Jan. 15, 2015

(30) Foreign Application Priority Data
Mar. 7, 2012 (JP) .................................. 2012-050918

(51) Int. Cl.
*C08G 77/00* (2006.01)
*C08G 77/06* (2006.01)
*C08G 77/60* (2006.01)

(52) U.S. Cl.
CPC ................ *C08G 77/06* (2013.01); *C08G 77/00* (2013.01); *C08G 77/60* (2013.01)

(58) Field of Classification Search
None
See application file for complete search history.

(56) References Cited

U.S. PATENT DOCUMENTS 4,587,205 A * 5/1986 Harrah et al. .................. 430/326
4,960,523 A * 10/1990 Degen et al. .................. 210/721
(Continued)

FOREIGN PATENT DOCUMENTS

CN 1880361 A 12/2006
CN 102027045 4/2011
(Continued)

OTHER PUBLICATIONS

Abu-eid et al. "Synthesis of Polysilane Polymer Precursors and Their Pyrolysis to Silicon Carbides" Eur. Polym. J. vol. 28 (3), 315-320, 1992.*

(Continued)

*Primary Examiner* — Robert S Loewe
(74) *Attorney, Agent, or Firm* — Oliff PLC

(57) ABSTRACT

The present invention provides a polydialkylsilane, and a method for producing a polydialkylsilane, including a step of adding a compound represented by formula (I) (in formula (I), $R^1$ and $R^2$ independently represent an alkyl group, and $X^1$ and $X^2$ independently represent a halogen atom) to an organic solvent containing an alkali metal, in which $0.010\ [hr^{-1}] \leq$ the average addition rate of compound (I) [moles·$hr^{-1}$]/the amount of the alkali metal [moles]$\leq 0.055\ [hr^{-1}]$.

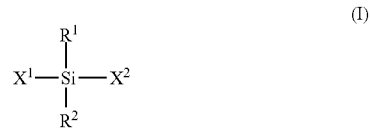

5 Claims, 1 Drawing Sheet

(56) References Cited

U.S. PATENT DOCUMENTS

| | | | | |
|---|---|---|---|---|
| 5,159,043 A | * | 10/1992 | Mori et al. | 528/14 |
| 5,905,139 A | * | 5/1999 | Mori et al. | 528/491 |
| 6,114,500 A | * | 9/2000 | Mori et al. | 528/490 |
| 2005/0222359 A1 | * | 10/2005 | Machida et al. | 528/14 |
| 2011/0071269 A1 | * | 3/2011 | Oohata et al. | 528/31 |

FOREIGN PATENT DOCUMENTS

| | | |
|---|---|---|
| JP | A-58-185628 | 10/1983 |
| JP | A-05-086199 | 4/1993 |
| JP | A-05-255509 | 10/1993 |
| JP | A-08-283415 | 10/1996 |
| WO | WO 2009/142161 A1 | 11/2009 |

OTHER PUBLICATIONS

Machine-generated English language translation of JP-05086199, 5 pages, translation generated Nov. 2014.*

Jun. 12, 2014 Taiwanese Office Action issued in Taiwanese Application No. 102106882 (with translation).

May 21, 2013 International Search Report issued in International Application No. PCT/JP2013/055120 (with translation).

Apr. 17, 2015 Examination Report issued in Taiwanese Application No. 103131133.

* cited by examiner

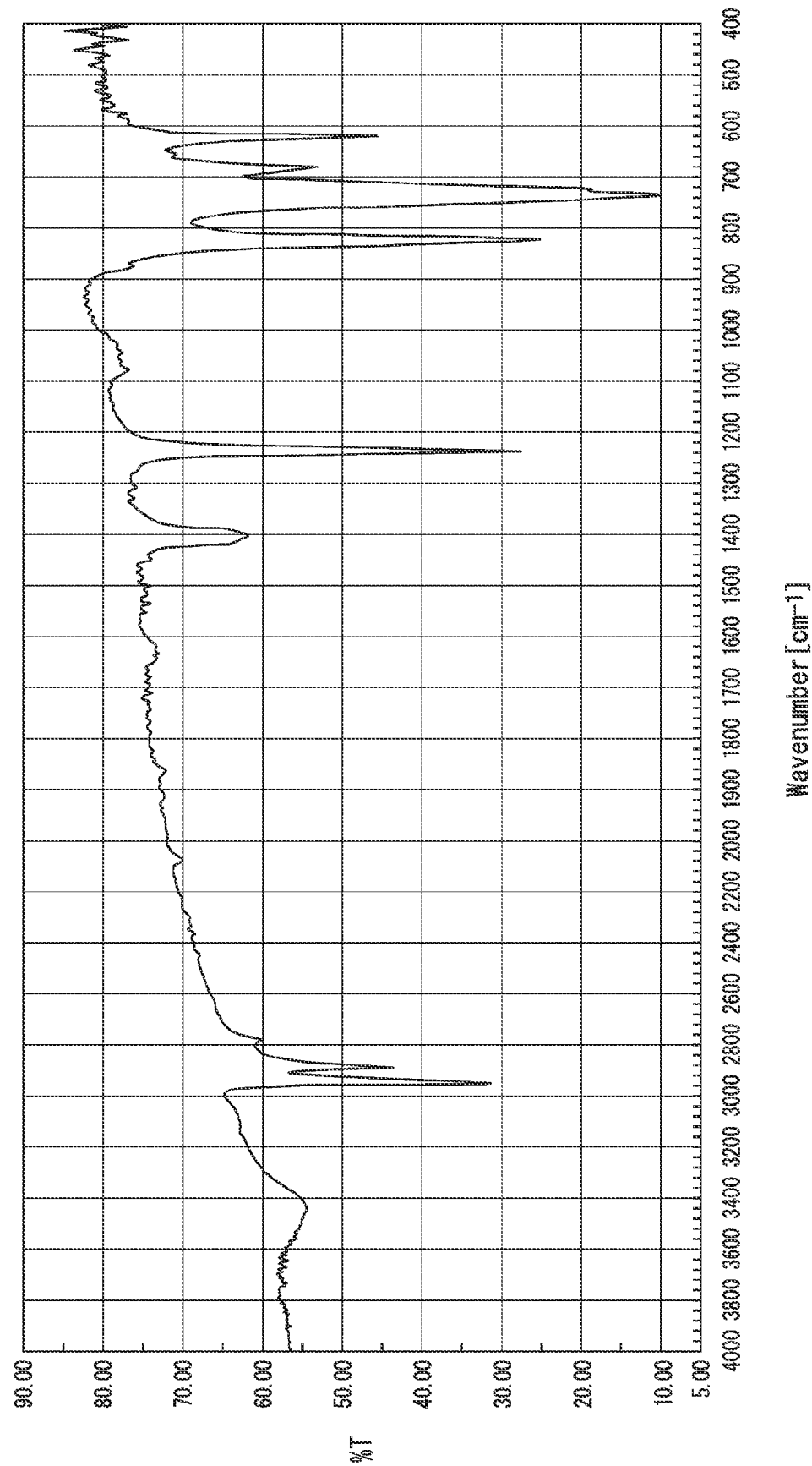

METHOD FOR PRODUCING POLYDIALKYLSILANE

TECHNICAL FIELD

The present invention relates to a method for producing a polydialkylsilane. More specifically, the present invention relates to a method for producing a high-purity polydialkylsilane including a reduced amount of a compound having Si—O bond.

Priority is claimed on Japanese Patent Application No. 2012-050918, filed on Mar. 7, 2012, the content of which is incorporated herein by reference.

BACKGROUND ART

Polydialkylsilanes have been investigated as optical and electronic functional materials used in precursors of silicon carbide materials, organic photoreceptors, optical waveguides, optical memory, or the like. Such polydialkylsilanes can be produced by subjecting dialkylhalosilanes to a reaction in the presence of an alkali metal. For example, in PTL 1, it is disclosed that polydimethylsilane is produced by melting or dispersing 1.05 moles of sodium metal in toluene, adding 0.5 moles of dimethyldichlorosilane dropwise to the dispersion over 8 hours (average addition rate=0.0625 moles·hr$^{-1}$), and subjecting the mixture to a reaction at a toluene reflux temperature.

CITATION LIST

Patent Literature

[PTL 1] PCT International Publication No. WO2009/142161A1

SUMMARY OF INVENTION

Technical Problem

The present invention has an object to provide polydimethylsilane which exhibits high performance as an optical and electronic functional material, or the like, and has another object to provide a method for producing a high-purity polydialkylsilane having a reduced amount of compounds having Si—O bonds.

Solution to Problem

The present inventors have conducted extensive studies in order to solve the above-described problems, and as a result, they have found that a polydialkylsilane having a peak intensity ratio at around 1100 cm$^{-1}$ and around 1250 cm$^{-1}$ in the Fourier transform infrared absorption spectrum at a specific value or less has a low content of compounds having Si—O bonds, and is thus expected to have high performance as an optical and electronic functional material, or the like. Further, the present inventors have found that by-production of compounds having Si—O bonds is inhibited by adding a compound represented by formula (I) to an organic solvent containing an alkali metal at a specific average addition rate, whereby a high-purity polydialkylsilane can be produced. The present inventors have further conducted investigations based on this knowledge, thereby completing the present invention.

That is, the present invention includes the following aspects.

(1) A method for producing a polydialkylsilane, including:
a step of adding a compound (I) represented by formula (I) to an organic solvent containing an alkali metal:

[Chem. 1]

$$X^1-\underset{\underset{R^2}{|}}{\overset{\overset{R^1}{|}}{Si}}-X^2 \quad (I)$$

(In formula (I), $R^1$ and $R^2$ independently represent an alkyl group, and $X^1$ and $X^2$ independently represent a halogen atom.), which satisfies a condition of 0.010 [hr$^{-1}$]≤the average addition rate of compound (I) [moles·hr$^{-1}$]/the amount of the alkali metal [moles]≤0.055 [hr$^{-1}$].

(2) The production method as described in (1), in which the amount of the alkali metal relative to one mole of compound (I) is from 2.0 moles to 5.0 moles.

(3) The production method as described in (1) or (2), in which the alkali metal is metallic sodium.

(4) A polydialkylsilane represented by formula (II):

[Chem. 2]

$$\left(\underset{\underset{R^2}{|}}{\overset{\overset{R^1}{|}}{Si}}\right)_n \quad (II)$$

(In formula (II), $R^1$ and $R^2$ independently represent a linear or branched alkyl group, and n represents an integer of 2 to 50,000),
in which the peak intensity ratio at around 1100 cm$^{-1}$ and around 1250 cm$^{-1}$ in the Fourier transform infrared absorption spectrum is from 0 to 0.05.

Advantageous Effects of Invention

According to the production method of the present invention, a high-purity polydialkylsilane can be obtained by inhibiting the by-production of compounds having Si—O bonds. Further, the polydialkylsilane of the present invention has a low content of compounds having Si—O bonds and is expected to have high performance as a precursor of silicon carbide materials, optical and electronic functional materials, or the like.

BRIEF DESCRIPTION OF DRAWING

FIG. 1 is a view illustrating the Fourier transform infrared absorption spectrum of the polydimethylsilane obtained in Example 1.

DESCRIPTION OF EMBODIMENTS (Polydialkylsilane)
The polydialkylsilane of the present invention is a polymer compound represented by formula (II).

[Chem. 3]

In formula (II), $R^1$ and $R^2$ independently represent an alkyl group, and n represents the number of repeating units. n is a number corresponding to the molecular weight of the polydialkylsilane and may be an appropriate number according to the uses, as described later. However, it is preferably from 2 to 50,000.

The alkyl group in formula (II) is preferably an alkyl group having 1 to 6 carbon atoms. The alkyl group may be linear or branched.

Examples of the polydialkylsilane include polydimethylsilane, polydiethylsilane, polydi-n-propylsilane, polydi-i-propylsilane, polydi-n-butylsilane, polydi-n-pentylsilane, and polydi-n-hexylsilane. Among these, polydimethylsilane is preferred.

The polydialkylsilane of the present invention has a peak intensity ratio at around 1100 cm$^{-1}$ and around 1250 cm$^{-1}$ of 0 to 0.05, and preferably 0 to 0.04 in the Fourier transform infrared absorption spectrum. If this peak intensity ratio is less, the polydialkylsilane has a low content of compounds having Si—O bonds and can be thus expected to have high performance as a precursor of silicon carbide materials, optical and electronic functional materials, or the like. Further, in the Fourier transform infrared absorption spectrum, KBR pellets of the polydialkylsilane are measured in a range of 4000 cm$^{-1}$ to 400 cm$^{-1}$ by means of FT/IR-550 (manufactured by JASCO Corporation). Examples of the compounds having Si—O bonds, which may be contained in the polydialkylsilane in some cases, include hexaalkylcyclotrisiloxane, octaalkylcyclotetrasiloxane, and decaalkylcyclopentasiloxane.

(Method for Producing Polydialkylsilane)

The method for producing a polydialkylsilane of the present invention includes adding a compound represented by formula (I) to an organic solvent containing an alkali metal.

[Chem. 4]

In formula (I), $R^1$ and $R^2$ independently represent an alkyl group, and $X^1$ and $X^2$ independently represent a halogen atom. Specific examples of the alkyl group in formula (I) include the same groups as the alkyl groups exemplified in the description of formula (II).

Examples of the halogen atom include a chlorine atom, a fluorine atom, a bromine atom, and an iodine atom. Among these, a chlorine atom is preferred.

Examples of compound (I) include dichlorodimethylsilane, dichlorodiethylsilane, dichlorodi-n-propylsilane, dichlorodi-i-propylsilane, dichlorodi-n-butylsilane, dichlorodi-n-pentylsilane, dichlorodi-n-hexylsilane, dibromodimethylsilane, dibromodiethylsilane, dibromodi-n-propylsilane, dibromodi-i-propylsilane, dibromodi-n-butylsilane, dibromodi-n-pentylsilane, and dibromodi-n-hexylsilane. Among these, dichlorodimethylsilane is preferred. Compound (I) is commercially available and any one appropriately selected from the commercially available products thereof can be used in the present invention. Further, compound (I) can also be synthesized according to a known method.

Examples of the alkali metal used in the present invention include metallic lithium, metallic sodium, metallic potassium, or alloys thereof. Among these, metallic sodium is preferred.

The amount of the alkali metal used is not particularly limited, but it is usually from 2.0 moles to 5.0 moles, preferably from 2.2 moles to 5.0 moles, and more preferably from 2.2 moles to 3.0 moles, with respect to one mole of compound (I). In the case where the amount of the alkali metal used is small, the reaction rate tends to decrease. If the amount of the alkali metal used is too large, the amount of the alkali metal remaining after completion of the reaction increases, and the cost thus tends to be increased.

Examples of the organic solvent used in the reaction include aromatic hydrocarbon-based solvents such as benzene, toluene, xylene, and mesytylene; ether-based solvents such as tetrahydrofuran, 2-methyltetrahydrofuran, 1,4-dioxane, anisole, 1,2-dimethoxyethane, diethylene glycol dibutyl ether, diethylene glycol diethyl ether, diethyl ether, diisopropyl ether, and t-butylmethyl ether; and aliphatic hydrocarbon-based solvents such as hexane, heptane, octane, and decane. These may be used singly or in combination of two or more kinds thereof. Among these, an aromatic hydrocarbon-based solvent is preferred, and toluene and xylene are more preferred.

The reaction is carried out by dispersing alkali metals in the organic solvent and adding compound (I) to the dispersion while stirring. Compound (I) may be added in the state of a solution by dilution of compound (I) in an organic solvent, or may be added as it is without dilution.

The addition of compound (I) is carried out under a condition of 0.010 [hr$^{-1}$]≤the average addition rate of compound (I) [moles·hr$^{-1}$]/the amount of the alkali metal [moles]≤0.055 [hr$^{-1}$], and more preferably 0.010 [hr$^{-1}$]≤the average addition rate of compound (I) [moles·hr$^{-1}$]/the amount of the alkali metal [moles]≤0.050 [hr$^{-1}$]. If the compound (I) is added under this condition, the by-production of compounds having Si—O bonds can be inhibited. Further, the average addition rate of compound (I) is a value obtained by dividing the total amount [moles] of compound (I) used by the addition time [hr]. The addition time [hr] of compound (I) is a time [hr] taken from the start of addition of compound (I) to the completion of addition. The addition of compound (I) may be carried out either continuously or intermittently, but the addition of a constant amount of compound (I) is preferably carried out continuously from the viewpoint of production efficiency.

The reaction of compound (I) in the presence of the alkali metal may be carried out at any temperature, but it is preferably carried out at a temperature of 98° C. to a solvent reflux. The reaction is preferably carried out in an atmosphere of an inert gas such as nitrogen. Further, the reaction can be carried out at a normal pressure or under pressurization. In order to increase the reaction conversion rate, after completion of the addition of compound (I), stirring is carried out continuously, preferably for 1 hour to 24 hours, and more preferably for 1 hour to 12 hours, at the reaction temperature.

By the reaction, a liquid formed by dispersing a crude polydialkylsilane in an organic solvent is obtained. This dispersion is cooled to about 40° C. to 80° C., and then the alkali metals are deactivated. For the deactivation of alkali metals, alcohols can usually be used.

Examples of the alcohols to be used for the deactivation include methanol, ethanol, isopropylalcohol, n-propylalcohol, 2-methylpropylalcohol, n-butylalcohol, t-butylalcohol, and ethylene glycol. Among these, methanol is preferred. The amount of the alcohols used is at least one mole with respect to one mole of the residual alkali metals.

Subsequently, water can be added to the liquid after the deactivation to perform hydrolysis. The amount of water used is not particularly limited as long as it is an amount sufficient for hydrolysis and dispersion of polydimethylsilane.

In the step of deactivation and hydrolysis of the alkali metals, it is preferable to allow a surfactant to be dissolved in an alcohol used for deactivation of the alkali metals and/or to allow a surfactant to be dissolved in water used for hydrolysis. By the surfactant, the dispersibility of crude polydimethylsilane increases, and thus, the efficiency of contact with water in water washing as described later increases.

Examples of the surfactant used in the present invention include an anionic surfactant, a cationic surfactant, an amphoteric surfactant, and a non-ionic surfactant.

Examples of the anionic surfactant include fatty acid salt, alkylbenzene sulfonate, a higher alcohol sulfuric ester salt, a polyoxyethylenealkyl ether sulfuric salt, an α-sulfofatty acid ester, an α-olefin sulfonate, a monoalkylphosphoric ester salt, and alkanesulfonate.

Examples of the cationic surfactant include an alkyltrimethylammonium salt, a dialkyldimethylammonium salt, and an alkyldimethylbenzylammonium salt.

Examples of the amphoteric surfactant include alkylaminoeoxide, alkylbetaine, alkylcarboxybetaine, and alkylaminofatty acid salt.

Examples of the non-ionic surfactant include polyoxyalkylenealkyl ether, polyoxyalkylenealkylphenyl ether, alkylglucoside, polyoxyethylenefatty acid ester, sucrose fatty acid ester, sorbitan fatty acid ester, polyoxyethylene sorbitan fatty acid ester, and fatty acid alkanolamide.

Among these, the anionic surfactant or the non-ionic surfactant is preferred, and the non-ionic surfactant is more preferred. As an alkyl chain contained in the non-ionic surfactant, those having 8 to 20 carbon atoms are preferred. The alkyl chain may be either a linear chain or a branched chain. Among the non-ionic surfactants, polyoxyethylenepropylenealkyl ether and polyoxyethylenepropylenealkylphenyl ether, which are polyoxyalkylenealkyl ethers, are preferred.

The surfactant used in the present invention is not particularly limited in terms of an HLB, but those having a high HLB are preferred. Specifically, those having an HLB of 5 to 20 are preferred, those having an HLB of 10 to 15 are more preferred, and those having an HLB of 12 to 15 are still more preferred. Further, the surfactant used in the present invention is not particularly limited in terms of a clouding point, but those having a clouding point of 0° C. to 100° C. are preferred, and those having a clouding point of 20° C. to 95° C. are more preferred. In addition, those having a clouding point in the vicinity of the water temperature during the water washing as described later are preferred. Specifically, the clouding point is preferably in the range of water temperature ±10° C. during the water washing, and more preferably in the range of water temperature ±5° C. during the water washing.

The amount of the surfactant added is preferably from 0.1 parts by mass to 20 parts by mass, and more preferably from 0.6 parts by mass to 8 parts by mass, with respect to 129 parts by mass of compound (I). If the amount of the surfactant is too small, the crystals easily float and the washing effect tends to be reduced. A large amount of the surfactant may be added, which is, however, not economical since the effect is saturated.

The reaction product is solidified by the hydrolysis, and thus becomes a slurry. The surfactant is included in the slurry. Thus, the slurry is washed with water. The water washing may be carried out after, during, or before the removal of the organic solvent. From the viewpoint that the stirring power may be low due to the reduced viscosity of the reaction product, it is preferable to carry out the water washing during or before the removal of the organic solvent. In addition, the method for removing the organic solvent is not particularly limited, and examples thereof include distillation and evaporation.

For the water washing, it is preferable to add water at a normal temperature to the product, to warm the product, or to add warm water. The water temperature during the washing is preferably 25° C. or higher, and more preferably from 40° C. to 80° C. Further, water which has been used for the water washing can be removed by a known solid-liquid separation operation such as decantation and filtration. The frequency of water washing is not particularly limited, but can be appropriately selected according to the situations of the removal of by-products of the alkali metal salts.

The water-washed polydialkylsilane is separated from the liquid by filtration or the like, and is dried. Before drying the polydialkylsilane after the separation, the surfactant which has been added can be removed by elution, using an organic solvent such as an alcohol and an aromatic hydrocarbon.

The polydialkylsilane obtained according to the production method of the present invention is usually insoluble in an organic solvent and an acid or alkali. The molecular weight of the polydialkylsilane obtained according to the production method of the present invention is not particularly limited. According to the applications, a polydialkylsilane having an appropriate molecular weight can be produced according to the production method of the present invention. For example, in "New Development of Organic Silicon Polymer" (edited by Hideki Sakurai, p. 106, CMC Publishing Co., Ltd.), a polydimethylsilane having a number-average molecular weight of 2580 and a weight-average molecular weight of 4650 is described, and a polydimethylsilane having such a degree of molecular weight can also be produced by the production method of the present invention. Further, the molecular weight of the polydialkylsilane can be determined by means of ultrahigh-temperature GPC.

EXAMPLES

Examples are shown below, which will describe the present invention in more detail. Further, the present invention is not limited to the following Examples.

Example 1

The inside of a four-neck flask equipped with a motor stirrer, a thermometer, a dropping funnel, and a reflux condenser was purged with nitrogen. The flask was charged with 29 g (1.25 moles) of metallic sodium and 62 g of toluene, and metallic sodium was made molten by heating to 110° C. or higher. The molten metallic sodium was dispersed by vigorous stirring. While maintaining the reflux state, 65 g (0.5 moles) of dimethyldichlorosilane was added to the flask over 8 hours (average addition rate=0.0625 mol·hr$^{-1}$). The contents were gradually discolored to blackish purple. After completion of the addition, the reflux state was maintained for 8 hours under stirring. A slurry in blackish purple was obtained.

The slurry was cooled to 40° C., and then 0.4 g of a non-ionic surfactant (polyoxyalkylenealkyl ether, HLB=14.1, clouding point of 65° C. (New Kalgen D-1110DIR manufactured by TAKEMOTO OIL&FAT Co., Ltd.)) was added thereto, followed by dissolution. Thereafter, 16 g (0.50 moles) of methanol was slowly added dropwise. The metallic sodium remaining in the slurry was reacted with methanol to give sodium methoxide, which was then deactivated. Water was added thereto to perform hydrolysis. The fluidity was gradually lowered to give a purple mass. When this reaction mixture was heated under slow stirring to evaporate toluene/water, the solidified mass changed to white and slowly dissociated to give a slurry.

This slurry was filtered under reduced pressure and an aqueous phase containing an alkali metal salt or the like was discharged. 100 g of warm water at 40° C. was added to the separated solid content, followed by stirring for 30 minutes. By filtration under reduced pressure, a solid content was obtained. This water washing operation was carried out five times in total. Subsequently, in the same manner as that of this water washing operation, washing with 48 g of methanol was carried out three times, and washing with 52 g of toluene was carried out three times. The obtained solid content was taken out of the filtering device and dried to obtain 26 g of white polydimethylsilane.

The Fourier transform infrared absorption spectrum of the obtained polydimethylsilane is shown in FIG. 1. The peak intensity ratio at around 1100 cm$^{-1}$ and around 1250 cm$^{-1}$ was 0.035.

Example 2

By the same method as in Example 1 except that the addition period of dimethyldichlorosilane was changed to 13 hours (average addition rate=0.0385 mol·hr$^{-1}$) and the amount of toluene introduced was changed to 56 g, dimethylpolysilane was produced. The peak intensity ratio at around 1100 cm$^{-1}$ and around 1250 cm$^{-1}$ of the obtained dimethylpolysilane was 0.033.

Example 3

By the same method as in Example 1 except that the addition period of dimethyldichlorosilane was changed to 16 hours (average addition rate=0.0313 mol·hr$^{-1}$) and the amount of metallic sodium was changed to 26 g (1.11 moles), dimethylpolysilane was produced. The peak intensity ratio at around 1100 cm$^{-1}$ and around 1250 cm$^{-1}$ of the obtained dimethylpolysilane was 0.039.

Example 4

By the same method as in Example 1 except that the addition period of dimethyldichlorosilane was changed to 24 hours (average addition rate=0.0208 mol·hr$^{-1}$), dimethylpolysilane was produced. The peak intensity ratio at around 1100 cm$^{-1}$ and around 1250 cm$^{-1}$ of the obtained dimethylpolysilane was 0.031.

Comparative Example 1

By the same method as in Example 1 except that the amount of metallic sodium was changed to 21 g (0.9 moles), dimethylpolysilane was produced. The peak intensity ratio at around 1100 cm$^{-1}$ and around 1250 cm$^{-1}$ of the obtained dimethylpolysilane was 0.058.

Comparative Example 2

By the same method as in Example 1 except that the amount of metallic sodium was changed to 24 g (1.06 moles), dimethylpolysilane was produced. The peak intensity ratio at around 1100 cm$^{-1}$ and around 1250 cm$^{-1}$ of the obtained dimethylpolysilane was 0.065.

From the results above, it can be seen that according to the present invention, if compound (I) is added to an organic solvent containing an alkali metal under the condition of 0.010≤the average addition rate of compound (I) [moles·hr$^{-1}$]/the amount of the alkali metal [moles]≤0.055 [hr$^{-1}$], a polydialkylsilane having a peak intensity ratio at around 1100 cm$^{-1}$ and around 1250 cm$^{-1}$ of 0.05 or less can be produced. Further, from the viewpoint that the peak shown at around 1100 cm$^{-1}$ has a low intensity, the polydialkylsilane obtained by the production method of the present invention has a low content of compounds having Si—O bonds.

INDUSTRIAL APPLICABILITY

By the production method of the present invention, a high-purity polydialkylsilane can be obtained by inhibiting the by-production of compounds having Si—O bonds. Further, the polydialkylsilane of the present invention has a low content of compounds having Si—O bonds, is expected to have high performance as a precursor of silicon carbide materials or optical and electronic functional materials, and is therefore useful industrially.

The invention claimed is:

1. A method for producing a polydialkylsilane, comprising:
   a step of adding a compound (I) represented by formula (I) to an organic solvent containing an alkali metal

(in formula (I), R$^1$ and R$^2$ independently represent an alkyl group, and X$^1$ and X$^2$ independently represent a halogen atom),
wherein 0.010 [hr$^{-1}$] the average addition rate of compound (I) [moles·hr$^{-1}$]/the amount of the alkali metal [moles]≤0.055 [hr$^{-1}$].

2. The production method according to claim 1, wherein the amount of the alkali metal relative to one mole of compound (I) is from 2.0 moles to 5.0 moles.

3. The production method according to claim 2, wherein the alkali metal is metallic sodium.

4. The production method according to claim 1, wherein the alkali metal is metallic sodium.

5. A polydialkylsilane produced according to the method of claim 1, wherein the peak intensity ratio at around 1100 cm$^{-1}$ and around 1250 cm$^{-1}$ in the Fourier transform infrared absorption spectrum is from 0 to 0.05.

* * * * *